United States Patent [19]

Gilbert

[11] 4,168,508

[45] Sep. 18, 1979

[54] AUDIO-TO-VIDEO CONVERTER-MODULATOR

[76] Inventor: William C. Gilbert, R.R. 2, Box 108, Greenfield, Ind. 46140

[21] Appl. No.: 856,402

[22] Filed: Dec. 1, 1977

[51] Int. Cl.$^2$ .............................................. H04N 9/12
[52] U.S. Cl. ..................................................... 358/82
[58] Field of Search .................................... 358/81, 82

[56] References Cited

U.S. PATENT DOCUMENTS

| 4,068,262 | 1/1978 | Sandler et al. .......................... 358/82 |
| 4,081,829 | 3/1978 | Brown .................................... 358/82 |

Primary Examiner—Robert L. Richardson
Attorney, Agent, or Firm—Woodard, Weikart, Emhardt & Naughton

[57] ABSTRACT

An audio signal to color pattern display signal converter-modulator includes an input audio signal section, four frequency band filters, horizontal sync and sweep circuitry, vertical sync and sweep circuitry, a pulse width modulator section, a level converter-modulator matrix, a chroma encoder circuit section and a chroma and luminance modulator and video output circuit section. The pulse width modulator section includes a CMOS NAND gate associated with each of the four frequency band filters, each NAND gate and each filter combination corresponding to a different primary display color. Each NAND gate has one input coupled to an output voltage signal from its corresponding filter section and the other NAND gate input is coupled to a sine wave signal. There are four such sine wave signals each sequentially phase shifted by 90° from the preceding adjacent sine wave. The resulting pattern, which is displayed on a television receiver, is a vertical stack of four elliptical areas (when all four NAND gates are turned on) each area being of a different color. As the particular audio signal within each frequency band increases and decreases in amplitude, the corresponding elliptical area increases and decreases about a center point causing adjacent elliptical areas to overlap thereby creating color blending.

37 Claims, 11 Drawing Figures

AUDIO-TO-VIDEO CONVERTER-MODULATOR

BACKGROUND OF THE INVENTION

This invention relates in general to audio-to-video converters and in particular to such converter-modulator devices which display a changing multicolored pattern on a television receiver.

There are various audio-to-video converting devices. Possibly one of the more basic devices is the circuit which divides the incoming audio into frequency bands with each frequency band corresponding to a particular group of like-colored lights, such as on a Christmas tree. As the audio varies, the various corresponding colored lights will be illuminated in a type of rythymic pattern representative of the audio.

With other devices this random grouping of colored lights has been replaced by a color television receiver and random illumination has been replaced by the creation of specific patterns. The following list of patents are representative of some of these devices:

| Patent No. | Patentee | Issue Date |
|---|---|---|
| 2,804,500 | Giacoletto | 8/27/57 |
| 3,604,852 | Weintraub | 9/14/71 |
| 3,627,912 | Hearn | 12/14/71 |
| 3,723,652 | Alles et al. | 3/27/73 |

Giacoletto discloses a system which divides the incoming audio into three frequency-color sections and each frequency-color section corresponds to a particular static banded pattern. The number of color bands increases as a function of frequency within the particular section. When a complex musical signal is present, these individual color bands will not be individually seen, but will be accumulated in a complex changing and random pattern.

Weintraub discloses an apparatus for visually displaying aesthetic configurations representative of sound including multicolor kinescope displays in which the degree of sharp curvatures or discontinuities is substantially reduced by jointly varying beam intensity and beam deflection as a function of sound spectral content. The color traces which result are actually Lissajous type figures wherein the color green is represented by a horizontally extended dotted line oval trace, corresponding to audio in the low frequency range. The color blue, corresponding to mid-range audio frequencies, is represented by a solid circular trace. The final color, red, corresponds to high frequency audio and is represented by a vertically extending oval trace.

Hearn discloses an apparatus and modifying circuit for use in conjunction with the conventional color cathode ray tube to provide fanciful wide-band vector representations of video signals. A variety of highly detailed patterns can be created but the display is limited to an outwardly radiating series of lines whose direction is controlled by X (horizontal) and Y (vertical) deflection.

Alles et al. discloses an audio-visual interface network for transforming audio signals from an audio source into a form suitable for reception and visual display by an "unaltered" television receiver. The incoming audio is separated into a plurality of different frequency bands and each group of signals are further processed by a resistor network with the result being a series of nine filtered, rectified and smoothed audio output signals. These nine output signals are used as the nine positions on a plurality of rotary switches, and the pattern generated is in part controlled by the various rotary switch settings. There is a second series of rotary switches and a particular audio pattern may be displayed in a variety of ways, depending on the particular combination of rotary switch settings selected. This particular device uses variable-duration monostable multivibrators and asymmetric phase-shifted square wave signals and the result is a kaleidoscopic pattern. There is no vertical drive capability disclosed, only horizontal bar widths, and the pictorial patterns are generally of a random nature without vertical blanking or sync pulses.

The purpose of these types of devices is to create means by which a changing audio signal can be transformed into particularly interesting and visually pleasing display patterns. The greater the pattern variety, the more interesting such device will remain over a long period of time. In addition to an interesting pattern, it would be desirable to design a low-cost device and a device which had a minimum of required operator controls. Furthermore, it is desirable to provide ample color areas so that the display is easily visible. The devices of Weintraub and Hearn are only line representations which are visually stationary about a center point. Neither of these patterns have the degree of color content (in large areas) which provides a desirable display, and the pattern variety is quite limited. The device of Giacolleto is a random blending of three colors whose color band alignments are fixed and the only variation is in the width of the color bands and how the three colors overlap. Audio volume does not affect the pattern and there is neither uniformity to the pattern nor are pleasing geometric shapes created.

The device of Alles et al. provides greater pattern variation but this is done by means of numerous rotary switch settings which must be selected by the operator. The disadvantage with this type of device is that pattern variety is quite limited unless the various settings are changed and this requires greater interaction by the operator. Various signals are either not generated or not used, such as vertical drive, which could add to pattern variety in a more automatic manner without requiring the extensive manual involvement which the device currently necessitates. Furthermore, the resultant pattern of Alles et al. is kaleidoscopic in nature, and the random display is not modulated in a symmetrical fashion which permits a more balanced display equally occupying the majority of the displaying area.

A further audio-to-video device is currently offered by Atari, Inc. and is identified as "Video Music." This device uses three different shapes which alternate randomly, or one may be selected, and operator controls are used to change the size of the pattern. Further pushbuttons select the rate at which the pattern changes.

None of the devices which have been mentioned provide means by which bass and treble can be accommodated so that the corresponding low and high frequency colors do not dominate the pattern being displayed. Similarly, none of these devices provide elliptical area patterns which are in a vertical stack and roll upwardly at a predetermined rate. Nor do any of these devices incorporate CMOS logic devices as pulse width modulators. None of these devices symmetrically increase and decrease the elliptical area size as audio amplitude increases and decreases, nor are there means disclosed for horizontally shifting the pattern center by 180° to create hyperbolic areas out of the elliptical areas. Additionally, none of these devices provide means to interrupt horizontal synchronizing pulses in order to create a jagged pattern edge.

There are additional video displaying circuits such as used with television gaming apparata. These apparata use operator input commands and signals to move such items as bars (representative of a ping pong paddle) or balls into various positions for the purpose of playing a game against an opponent. The following two patents are representative of such game apparata:

| Patent No. | Patentee | Issue Date |
|---|---|---|
| 3,659,284 | Rusch | 4/25/72 |
| 3,659,285 | Baer et al. | 4/25/72 |

These two patents are not audio to video devices and although patterns are displayed on a television receiver, their applicability to the art of the present invention is limited.

SUMMARY OF THE INVENTION

An audio signal to color pattern display signal converter-modulator according to one embodiment of the present invention comprises a power supply section, an input audio signal section, a plurality of filter sections, a frequency doubler circuit section, a horizontal sync and burst pulse circuit section, a vertical sync circuit section, a blanking sync and burst gate adder section, a sweep sync circuit section, a horizontal sweep oscillator circuit section, a vertical scanning circuit section, a pulse width modulator section, a level converter-modulator matrix section, a chroma encoder circuit section and a chroma and luminance modulator and video output circuit section. Each of the plurality of filter sections corresponds to a different frequency band and each frequency band corresponds to a different primary display color. The pulse width modulator section includes a plurality of logic device means each having a first input coupled to one of the filter sections and a second input coupled to a repeating wave signal for producing a pulse width output signal which is modulated about a center point.

One object of the present invention is to provide an improved audio signal to video display device.

Another object of the present invention is to provide an audio-to-video converter-modulator for displaying elliptical areas of different colors and changing sizes.

Related objects and advantages of the present invention will be apparent from the following description.

DESCRIPTION OF THE PREFERRED EMBODIMENT

Figure 1:
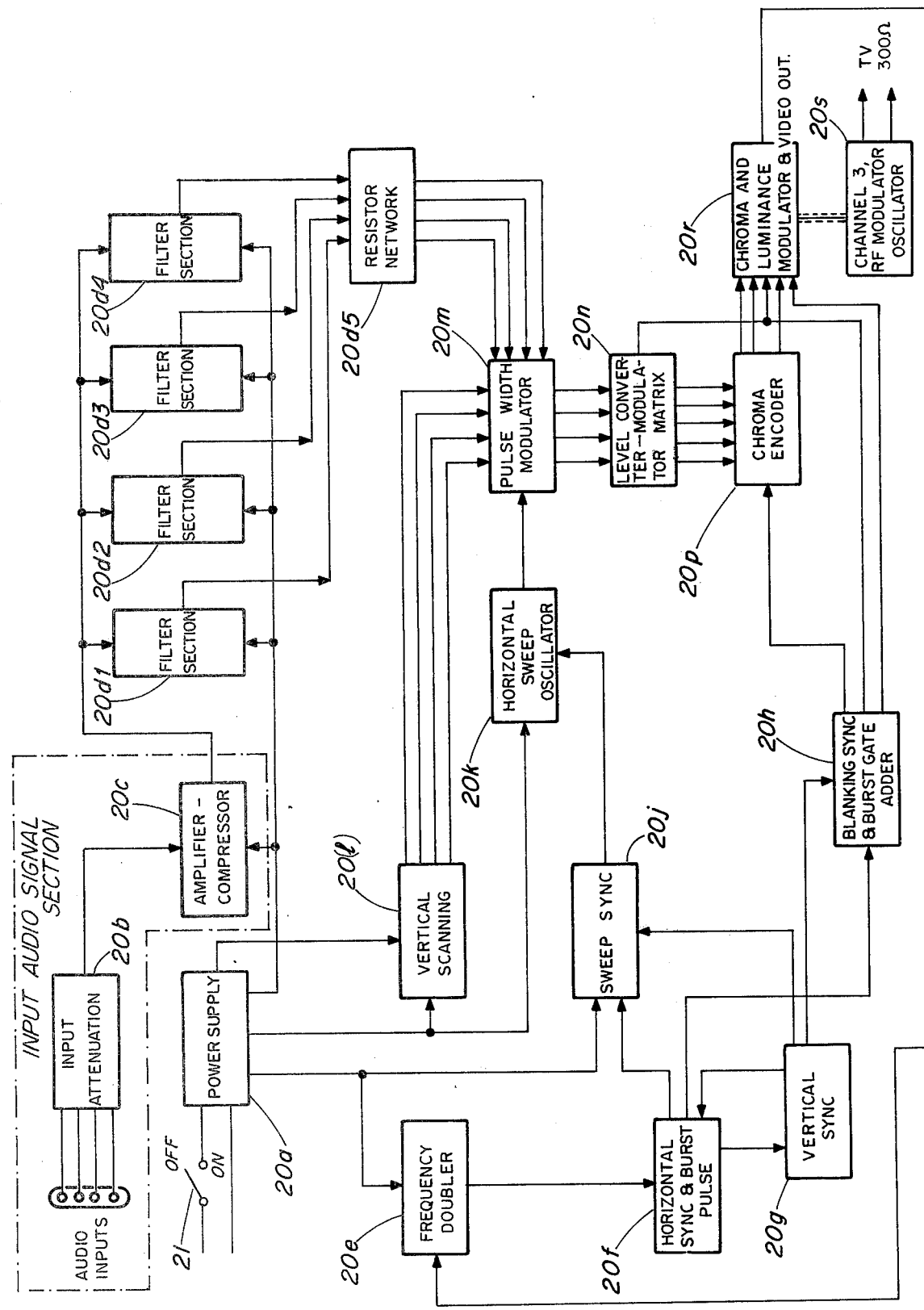
FIG. 1 is a block diagram of an audio-to-video converter-modulator circuit according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is illustrated in block diagram representative of a complete converter-modulator circuit 20 which converts audio into a changing array of shapes and colors for display on a cathode ray tube such as part of a color television receiver. This circuit includes a series of functional blocks 20a to 20s, each of which represents a different circuit section. Circuit section 20a represents the power supply section including ON-OFF control for the entire circuit as well as the various sources of power in the form of regulated 5-volt DC, 6-volt DC and 12-volt DC sources. The incoming audio which controls the color content and shapes which are displayed on the color television receiver (or cathode ray tube) is attenuated and isolated by circuit section 20b before amplification and automatic leveling (compression) take place in circuit section 20c. Circuit sections 20b and 20c can be thought of as an input audio signal section. Low frequency (bass) and high frequency (treble) notes which may be boosted by external audio means (as in loudness compensation) will not substantially affect color content due to reverse compensation to the input amplifier. The composite audio signal is filtered into four frequency band width ranges, one range representing a different primary display color. Filter section 20d1 covers the low frequency range up to 250 Hz for the color red; section 20d2 from 220 to 700 Hz for yellow; section 20d3 from 650 to 2,000 Hz for green; and section 20d4 from 1.8 to 15 KHz for the color blue. Section 20d5 provides a resistor network for coupling threshold voltages to the color control lines out from sections 20d1-20d4.

Circuit section 20e comprises the frequency doubler circuit section, section 20f the horizontal sync and burst pulse circuit section, section 20g the vertical sync circuit section and 20h the blanking sync and burst gate adder section. These circuit sections represent conventional circuitry which is necessary for the generation and transmission of signals which are suitable for video display on a television receiver.

Circuit section 20k comprises the horizontal sweep oscillator circuit section and section 20j the sweep sync circuit section. These two circuit sections utilize two sine wave signals—one at horizontal sweep frequency and the other near the vertical sweep frequency. Circuit section 20k comprises a free-running oscillator and the appropriate synchronizing pulse is provided by section 20j in response to a signal from section 20f. Also available is an interrupting pulse from section 20g (with an appropriate switch setting) causing an alternate locked-unlocked oscillator operation. Centering is accomplished by phase adjusting the sweep sync pulse output with respect to the horizontal sync pulse input. Circuit section 20(l) comprises the vertical scanning circuitry.

Circuit section 20m comprises the pulse width modulator circuitry which includes a series of CMOS, 2-input NAND gates. One input to each NAND gate is the signal provided by the corresponding filter section by means of its color control line. The other input signal to the NAND gate is provided by the horizontal sweep oscillator and vertical scanning circuit sections 20k and 20(l), respectively. These two sections provide sine wave signals which are resistively added before being applied to the corresponding gate input. The analog (DC) signal from the various audio filter sections controls the width of the pulse output from the CMOS NAND gates. These gates operate with a threshold level of between +5 volts DC and +7 volts DC which improves the turn-on sensitivity of the gates and keeps the gate input near the linear level.

Circuit section 20n comprises the level converter-modulator matrix section. This section includes a series of inverters, the output of each being coupled through a corresponding resistor network to one of four modulator lines. These four lines represent the plus (R-Y) modulator for red, the minus (B-Y) modulator for yellow, the plus (B-Y) modulator for blue and the minus (R-Y) modulator for green.

Circuit section 20p comprises the chroma encoder circuitry which translates analog single polarity logic signals from the above four modulator lines into dual polarity linear signals to match the input characteristics for chroma of the television video modulator integrated circuit in circuit section 20r. Circuit section 20r comprises the chroma and luminance modulator and video output circuitry. The heart of this section is a television video modulator which receives a variety of signal inputs and provides a composite video signal output. Positive and negative signals, relative to a positive 5 volt DC reference, control the color hues which are produced and the amplitude controls the color saturation. The video signal output is coupled to a conventional channel 3, RF modulator-oscillator comprising circuit section 20s. The modulator may be connected or disconnected to the television receiver by means of an antenna selector switch, and when in the "antenna" position, this switch completely isolates the preceding circuitry. When the modulator is switched for audio to video display, the television receiver will display on its screen a variety of shapes and colors whose pattern is constantly changing. This pattern is comprised of the four primary display colors (red, yellow, green and blue) each in either an elliptical area or hyperbolic shape and the center of each pattern is uniformly spaced from adjacent patterns in a vertical stack. The size of any one pattern (ellipse or hyperbola) is governed by the volume amplitude of the particular frequency band, such that the patterns expand and contract about its geometric center with increasing and decreasing audio volume. As the patterns expand, they cover a larger area of the screen and will blend to produce additional colors as they overlap with adjacent color areas.

Figure 2:
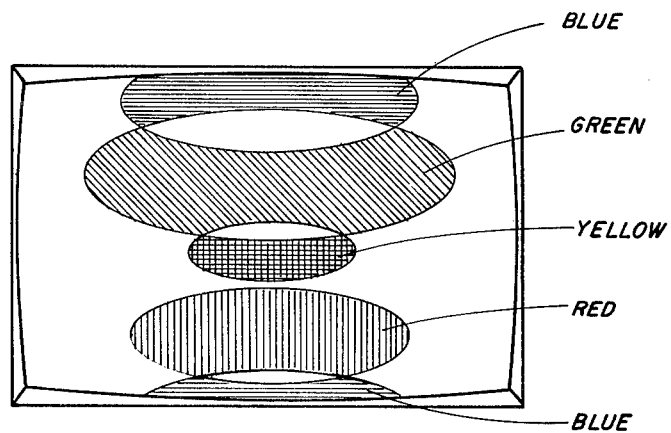
FIG. 2 is a diagrammatic representation of an elliptical pattern generated by the FIG. 1 circuit.
Figure 3:
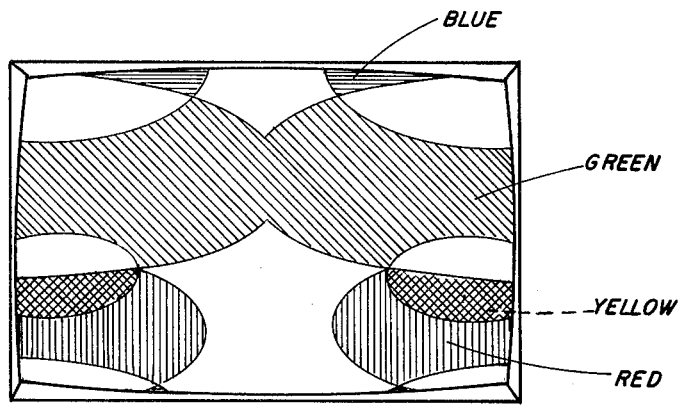
FIG. 3 is a diagrammatic representation of a hyperbolic pattern generated by the FIG. 1 circuit.

Further pattern variations are provided by the fact that the vertical sweep frequency is 60 Hz rather than a sync rate of approximately 59.92 Hz so that this vertical stack of the four primary colors and their elliptical area patterns roll upwardly at a rate of approximately one cycle every 12 seconds. As a top portion of the uppermost elliptical area goes off the top edge (the blue pattern) of the television receiver screen, this "lost" portion will reappear at the bottom edge of the screen. This effect is illustrated by FIG. 2. The blank areas between elliptical areas indicate the colors resulting from overlapping, such as, for example, orange, blue-green and yellow-green. There are also various operator controls, as part of the conveter-modulator, some of which are necessary for operation of the converter-modulator, others of which permit still further pattern variations such as converting the elliptical areas into hyperbolic areas. The pattern centering control which allows this shape transformation may be used to move the elliptical areas horizontally across the screen to any point between no shift and 180° of shift so that the elliptical areas may be actually hyperbolic areas converging toward the center of the television receiver screen from opposite edges, as mentioned, or may be merely shifted to one side of the screen. This shifted effect is illustrated in FIG. 3.

Figure 4:
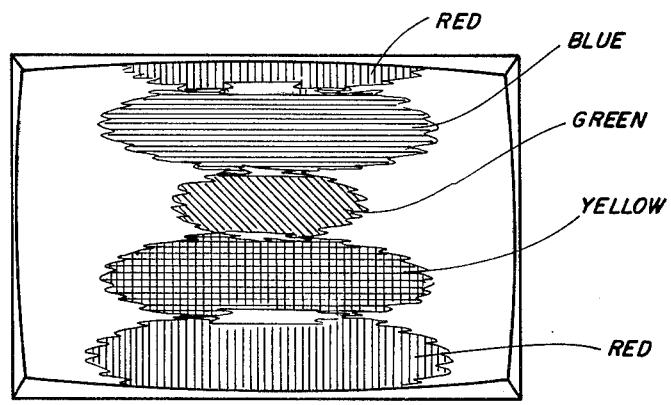
FIG. 4 is a diagrammatic representation of a jagged edged elliptical pattern generated by the FIG. 1 circuit.

A frequency lock-pattern adjustment switch may be used to cause a loss of sync to the horizontal scanning oscillator allowing it to "free-run" and causing a shift in phase compared to the sync pulse. This "tearing" or jagged edge effect is illustrated by FIG. 4.

Also provided is a PLAY-TEST switching circuit which allows the display of the various elliptical areas prior to coupling to incoming audio so that colors can be adjusted as well as centering and size control.

Figure 5:
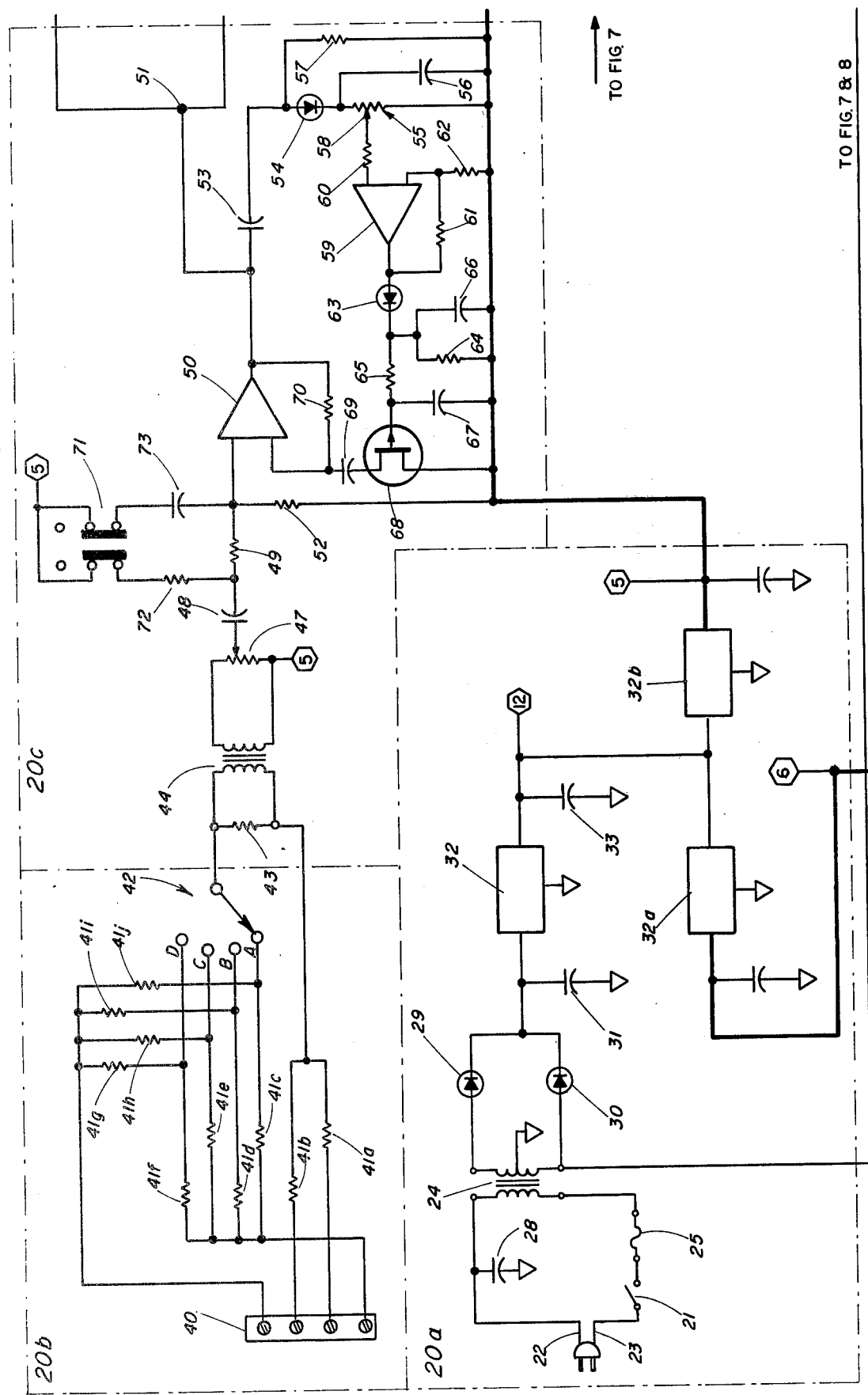
FIG. 5 is a schematic diagram of a portion of the circuitry comprising the overall converter-modulator circuit of FIG. 1.
Figure 11:
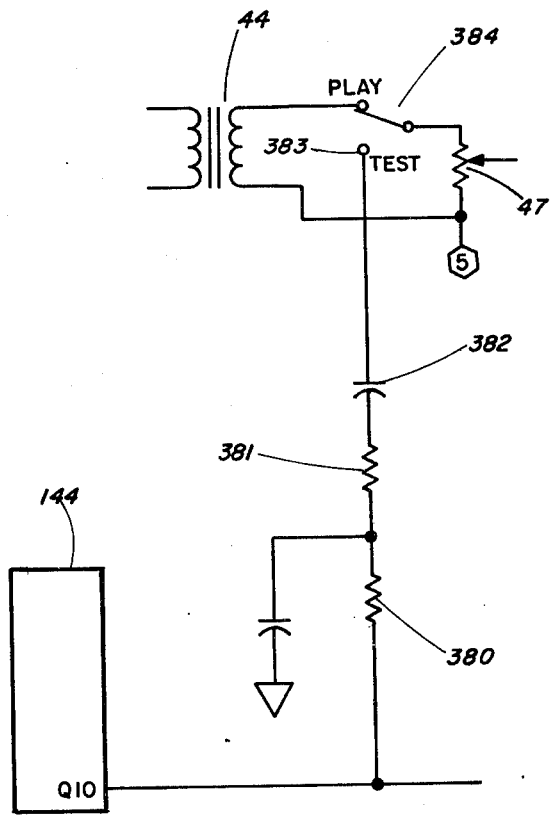
FIG. 11 is a schematic diagram of a test-play feature associated with the FIG. 1 audio-to-video converter-modulator circuit.

Referring now in detail to the individual circuit sections the circuitry employed to achieve the above-described patterns and effects will be discussed. Beginning with FIG. 5 and continuing through FIG. 11, the various Figures are connected as indicated on each Figure. The hexagon symbol used throughout indicates a regulated voltage potential and and the number inside indicates the voltage level.

Power for the converter-modulator circuit 20 is available through power supply section 20a from a conventional 110–120 volt AC, 60 Hz line such as from a house outlet, and the delivery of such power is controlled by ON-OFF switch 21. The input power lines 22 and 23 are coupled to transformer 24 which is stepped down to 36 volt AC secondary center tapped to common. Fuse 25 is provided as circuit protection and capacitor 28 is used to bypass line interference and internal radiation from the remaining circuitry. Diodes 29 and 30 and capacitor 31 provide a filtered DC for integrated circuit 32 which provides a regulated 12-volt DC. This regulated 12-volt output from integrated circuit 32 is filtered by capacitor 33 and serves as a current source for digital and linear portions of the circuit. Similarly, a filtered 6-volt DC supply and a filtered 5-volt DC supply are provided by means of this circuitry and by corresponding integrated circuits 32a and 32b. A suitable device for integrated circuit 32 is a 78M12UC offered by Fairchild Semiconductor Components Group of Mountain View, California. Similarly, suitable devices for integrated circuits 32a and 32b are a 78L06 WC and 78L05WC, respectively, offered by Fairchild Semiconductor Components Group.

The audio input which is the basis for the patterns which are generated and displayed on the television receiver may be either single channel or stereo and are connected to terminal block 40 in proper phase. Although the circuitry described will be relative to a stereo audio input, it is to be understood that only minor circuitry changes would be necessary for either single channel audio or four channel audio signals. It is also possible by means of redundant circuitry, although not detailed herein, to separate one audio channel from the other for displaying the corresponding pattern on one-half of the receiver display screen with the other channel displayed on the other half of the display screen. This stereo video effect is a contemplated modification of the present converter-modulator circuit. In order to accommodate various ranges of incoming audio power, a summing attenuator network 20b is provided. This network includes resistors 41a through 41j which are selectively connected together and coupled between terminal block 40 and four-position switch 42. Switch 42 is provided as an external operator control for the purpose of selecting the appropriate input power level depending upon the audio source. Switch position A corresponds to a one-watt audio power level and the attenuator network for this position includes resistors 41a, 41b, 41c, 41j and 43 and transformer 44. In position A, audio levels of up to 3 volts peak can be accommodated and matched through transformer 44 (which is actually part of both sections 20b and 20c but is shown in 20c) and then delivered to the remaining circuitry. The remaining switch positions B, C and D correspond to audio power levels of 10 watts, 100 watts and 1,000 watts, respectively. These power levels refer to an 8 ohm load. Similarly, with a different switch setting, the corresponding group of resistors will change.

Referring to amplifier-compressor circuit section 20c, the output from the secondary of transformer 44 is applied across potentiometer 47 which has its upper contact set so as to allow full compression. The signals are coupled through capacitor 48 and resistor 49 into amplifier 50 which has a variable gain with a range of approximately 30 db. Amplifier 50 is used to maintain a relatively constant peak output level at node 51 for the driving of the various audio filter sections described hereinafter. Amplifier 50 may be, for example, part of an MC1458CP1 offered by Motorola Semiconductor Products, Inc. of Phoenix, Arizona. As used in the disclosed circuit the MC1458CP1 component also provides amplifier 59 as described hereinafter. Resistor 52 sets the DC reference level for the amplifier output. In order to accomplish automatic leveling (compression) the AC output level at node 51 is coupled by capacitor 53 to diode 54 and the relative DC is developed across potentiometer 55 and capacitor 56. Resistor 57, which couples to diode 54, causes a roll off of low frequencies, such that the compression portion of the circuit is allowed to have greater control by mid-range and high audio frequencies. The average DC level developed across potentiometer 55 is selected by wiper 58 which sets the peak AC at node 51. This DC level is applied to amplifier 59 through coupling resistor 60. The gain of amplifier 59 is approximately equal to the ratio of resistor 61 to resistor 62. For example, with resistor 61 selected at 100 K ohms and resistor 62 selected at 10 K ohms, amplifier 59 has a gain of approximately 10. The DC output of amplifier 59 is thus proportional to the average volume at node 51. Diode 63 couples the DC output of amplifier 59 to resistors 64 and 65 and capacitor 66. This diode coupling is used to develop fast attack of rising signals which are input to amplifier 50 and to restrict high gain recovery time to approximately 500 milliseconds such that dynamic music passages do not overload amplifier 50. Additional filtering of the DC voltage is accomplished by capacitor 67 and resistor 65 and is applied to the gate of field effect transistor 68. Transistor 68 is a P-channel FET, depletion mode device such as, for example, a 2N3820 whose dynamic resistance is increased by positively going voltage. The AC gain of amplifier 50 is varied by capacitor 69 which couples to resistor 70 which is in the feedback loop of amplifier 50. The setting of wiper 58 determines the average audio (in the form of AC voltage) present at node 51 by means of a feedback loop through amplifier 59, transistor 68 and capacitor 69. Amplifier 50 has a bandpass range of from approximately 30 Hz to 15 KHz as to signals from transformer 44 to node 51.

Certain audio sources which may be coupled to terminal block 40 may be loudness compensated by external audio switches and this compensation will increase the bass and treble response. Switch 71 is provided as an external operator control for the purpose of loudness compensation. With switch 71 positioned so as to connect resistor 72 and capacitor 73 to common, there will be a rolling off of the high and low frequency ends of the bandpass response of amplifier 50 creating a type of reverse compensation. A three db rolloff occuring at approximately 125 Hz at the low end and approximately 2,000 Hz at the high end will result in a somewhat flattened output response appearing at node 51 and prevent boosted bass and treble frequencies and their corresponding colors from dominating the display color pattern.

Figure 7:
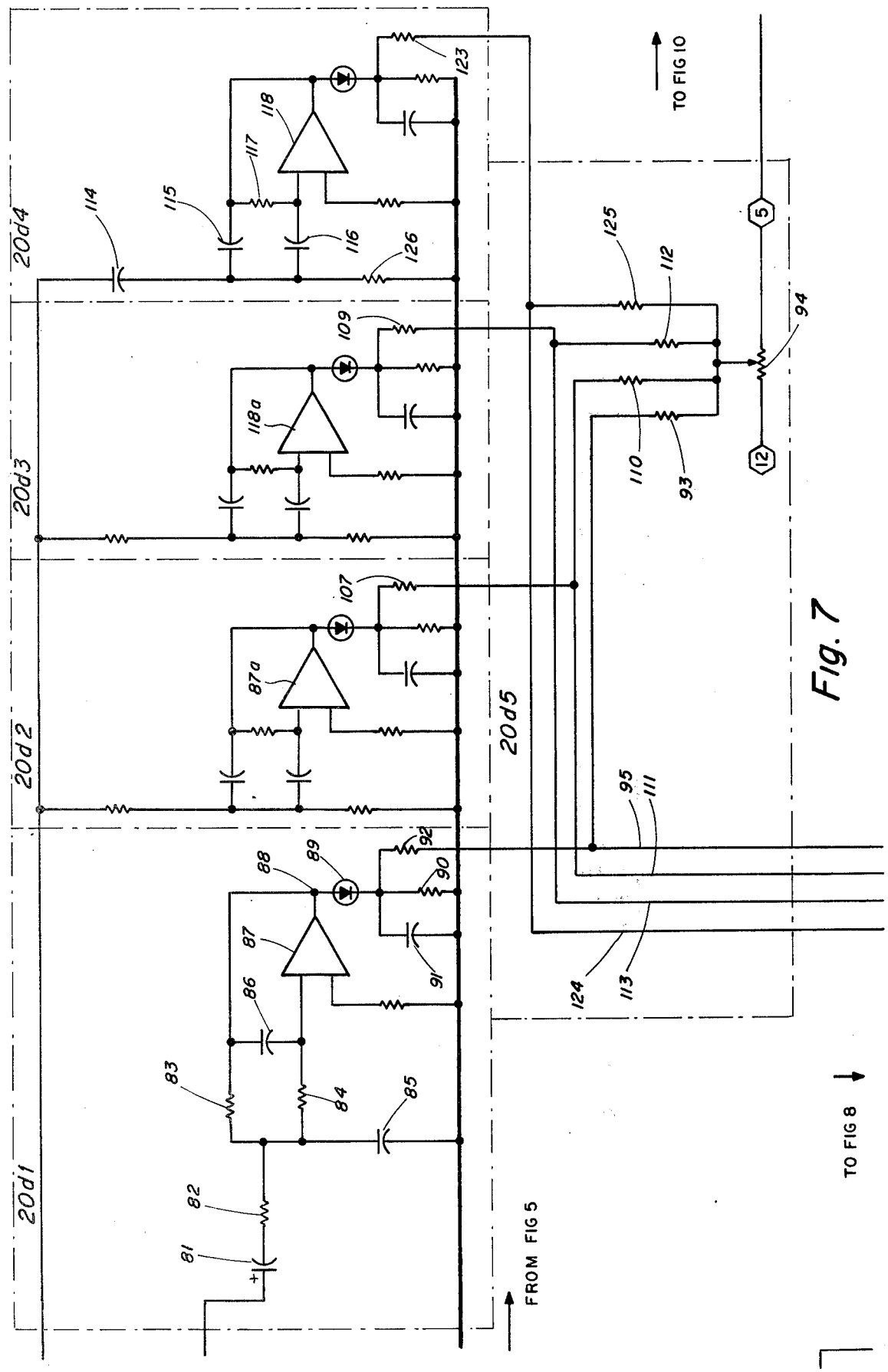
FIG. 7 is a schematic diagram of another portion of the circuitry comprising the overall converter-modulator circuit of FIG. 1.

One important aspect of the subject invention is to select frequency groupings which will have a pleasing color balance. That is, it is desirable to associate a particular color with a particular frequency range such that with a typical audio input (dynamic and random) no one color will dominate the display, but rather each color and color blend will appear in a somewhat balanced relationship. Therefore, four audio filter sections 20d1-20d4 are provided (see FIG. 7) for low, mid-range and high frequencies and correspond to the colors of red, yellow, green and blue. Low pass section 20d1 passes audio frequencies up to 250 Hz and is a typical resistor, capacitor and amplifier low pass network. The output from node 51 is applied through blocking capacitor 81 into filtering resistors 82, 83 and 84 and capacitor 85. Capacitor 86 serves as AC feedback around amplifier 87. A suitable device for amplifier 87 may be one part of an MC1458CP1 offered by Motorola Semiconductor Products, Inc. The other amplifier of the MC1458CP1 is utilized as amplifier 87a in circuit section 20d2. The component values are selected so as to provide a gain of approximately 2.25, a Q of approximately 0.7 and a roll-off frequency near 250 Hz. The low frequency output at node 88 is rectified by diode 89 and is applied as a DC signal which is proportional to the AC amplitude across the parallel combination of resistor 90 and capacitor 91 and coupling resistor 92. The values of resistor 90 and capacitor 91 are selected so as to yield a time constant of approximately 500 milliseconds in order to provide a slower decay time of the DC control signal which is coupled through resistor 92 to the "red" pulse width modulator section described hereinafter. In order to accommodate nominal static differences in pulse width modulator sensitivity, resistor 93 of circuit section 20d5 couples a static DC voltage (referred to as threshold voltage) from potentiometer 94 to red control line 95.

The mid-range frequencies (220-2,000 Hz) are divided into two color ranges. Signals for the color yellow are generated in response to frequencies from approximately 220-700 Hz as detailed by filter section 20d2 and signals for the color green are generated in response to audio frequencies from approximately 650 to 2,000 Hz by filter section 20d3. These two filter sections are basically of the same circuitry arrangement, the only substantive difference being in the particular component values selected. However, inasmuch as such types of filter circuit designs are well known in the art and that different frequency ranges can be achieved by changing component values, a detailed explanation of the operations of this circuit portion are not thought necessary. Both sections have a gain of approximately 2 and a Q of approximately 1.1. Filter section 20d2 develops a DC voltage level which is proportional to the signal within its frequency bandpass range and couples this voltage level signal through resistor 107 (as the yellow control signal) to the subsequent pulse width modulator section across line 111. Resistor 110 couples a threshold voltage from the wiper of potentiometer 94 to yellow control line 111. The DC voltage level developed within section 20d3 is coupled through resistor 109 to green control line 113. Similarly, resistor 112 couples a threshold voltage to green control line 113.

High-pass filter section 20d4 is basically of a conventional high-pass filter design with the output from node 51 being applied to capacitors 114, 115 and 116 and resistor 117 and into amplifier 118. The DC control voltage for the color blue couples to the pulse width modulator section through resistor 123 and threshold voltage is added to blue control line 124 through resistor 125. The gain of filter section 20d4 is selected at 2.5 and Q is established at 0.85. The bandpass frequency range is 2 KHz to 15 KHz with low end cut-off controlled by capacitors 114, 115 and 116 and resistors 117 and 126. The high end audio is limited by the input signal and the inherent roll-off of amplifier 118. A suitable device for amplifier 118 may be part of an MC1458CP1 offered by Motorola Semiconductor Products, Inc. The other amplifier of the MC1458CP1 is utilized as amplifier 118a in circuit section 20d3.

Figure 6:
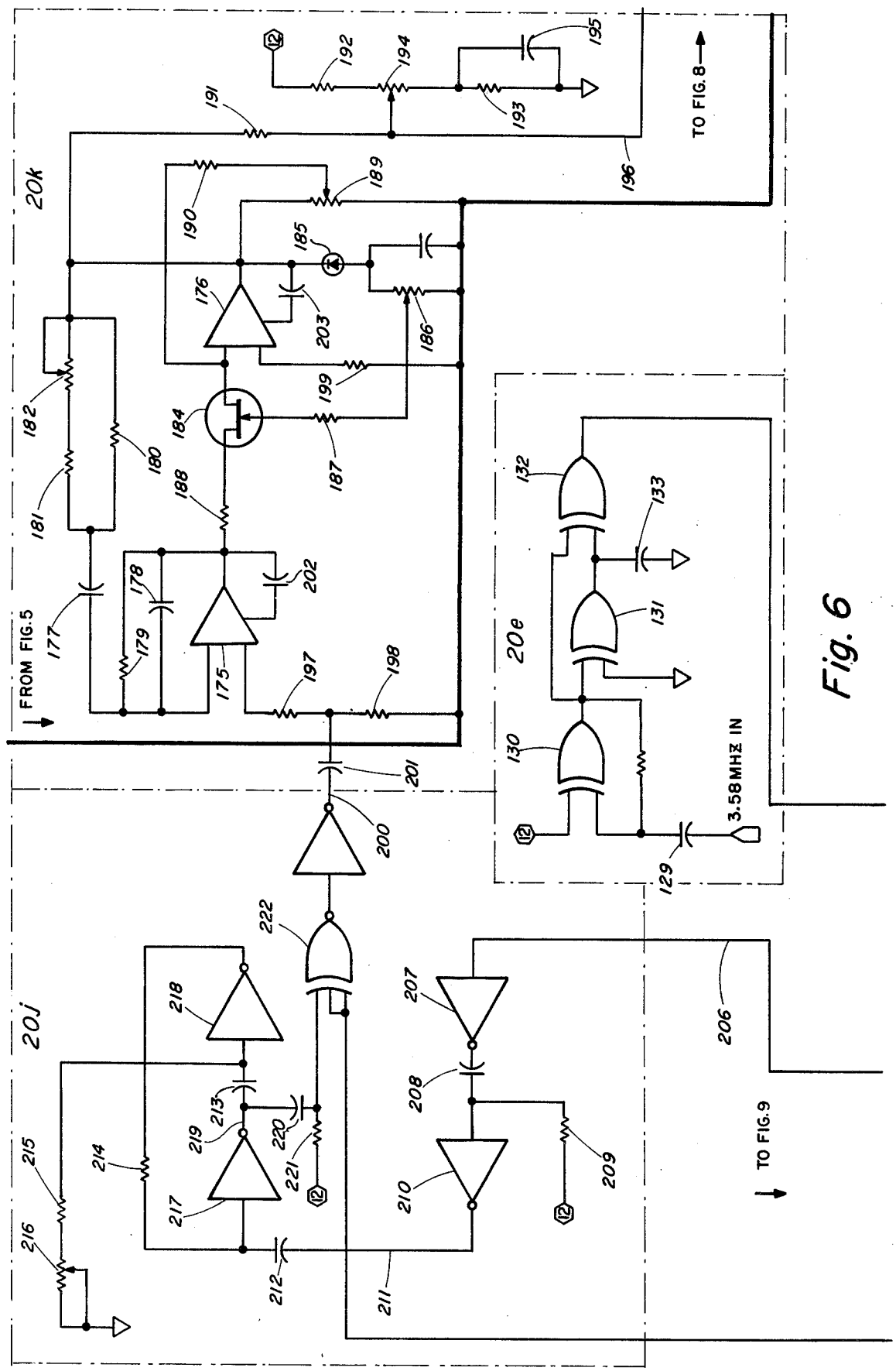
FIG. 6 is a schematic diagram of another portion of the circuitry comprising the overall converter-modulator circuit of FIG. 1.

The frequency doubler circuit section 20e (see FIG. 6) includes a series of exclusive OR gates and receives a 3 volt peak-to-peak, 3.58 MHz signal from section 20r. This input is coupled through capacitor 129 to one input of exlusive OR gate 130 and the other input coupled to a 12-volt reference. OR gate 130 thus amplifies the low level 3.58 MHz signal to a digital logic level signal. The output from exclusive OR gate 130 is direct coupled to one input each of exclusive OR gates 131 and 132. A suitable multi-gate device for OR gates 130, 131 and 132 is a 4070PC offered by Fairchild Semiconductor Components Group. As mentioned hereinafter, exclusive OR gate 142 is also a part of this same 4070PC device. Exclusive OR gate 131 is used as a follower with an inherent propogation delay enhanced by capacitor 133 thereby causing the two inputs to exclusive OR gate 132 to be out of phase for approximately 50% of the duty cycle. The result is an output from OR gate 132 which includes two pulses out for each pulse in to exlusive OR gate 130. The output of exclusive OR gate 132 is coupled to the clock input pin of integrated circuit 134 in circuit section 20f. A suitable device for integrated circuit 134 is a 4040PC offered by Fairchild Semiconductor Components Group.

Figure 9:
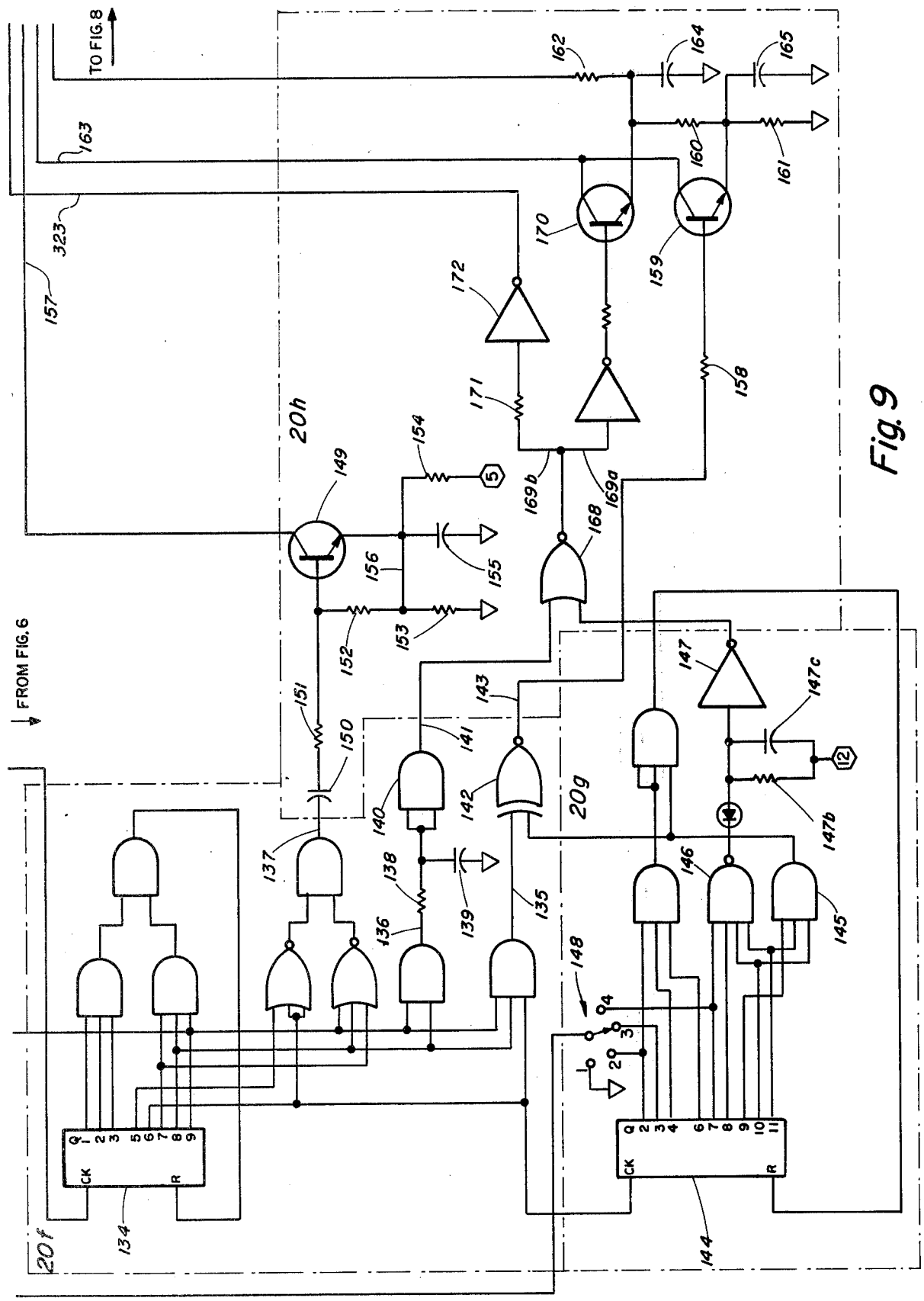
FIG. 9 is a schematic diagram of another portion of the circuitry comprising the overall converter-modulator circuit of FIG. 1.

Circuit section 20f (see FIG. 9) which controls the horizontal sync and the first pulse generator includes integrated circuit 134 and an arrangement of AND, OR and NOR gates. Integrated circuit 134 is a binary counter which is driven by a 7.159 MHz pulse signal from exclusive OR gate 132, which is divided by 456 resulting in an output frequency of 15,699 Hz which is used for horizontal sync line 135 and blanking line 136 and color burst flag pulses at line 137. The appropriate pulse width for the horizontal sync (line 135) is obtained by AND gating three pulses of appropriate width from the Q outputs of integrated circuit 134. The resulting signal on line 135 is within nominal pulse width for television sync control. The blanking pulse width control signal on line 136 is obtained by AND gating two pulses from the Q outputs of integrated circuit 134. The pulse width position on line 136 relative to the signal on 135 is leading by approximately 3 milliseconds, so resistor 138 and capacitor 139 are included to create a three millisecond delay so that the pulse signal out of AND gate 140 on line 141 is properly timed with respect to the signal on line 135. A suitable device for AND gate 140 may be found as one part of a multiple gate component such as a 4081PC offered by Fairchild Semiconductor Components Group. The color burst flag pulse on line 137 is obtained by NOR gating properly phased Q outputs from integrated circuit 134 and then AND gating the two outputs into a properly phased and timed pulse (relative to sync pulse on line 135) of the correct duration. Exclusive OR gate 142 combines horizontal and vertical sync pulses at output line 143 as is typical for television signal transmission.

The vertical sync circuit section 20g includes an integrated circuit and an arrangement of gates. Integrated circuit 144 is a binary counter which divides by 1,834. The input clock pulse from integrated circuit 134 has a frequency of 109,893 Hz and with the division of 1,834 a vertical sync rate of 59.92 Hz is obtained. Proper sync pulse width is developed by AND gate 145 whose output is applied as one input to exclusive OR gate 142 as previously described. A suitable device for AND gate 145 may be found as one part of a multiple gate component such as a 4073PC offered by Fairchild Semiconductor Components Group. Proper vertical blanking timing is obtained by NAND gating the appropriate Q outputs from integrated circuit 144 by NAND gate 146. A suitable multi-gate device for AND gate 146 is a 14501PC offered by Motorola Semiconductor Products, Inc. The other gates of this device being used as gates 168 and 263 which are described hereinafter. The output of NAND gate 146 is a single negative pulse with pulse width slightly short of nominal. "Pulse stretching" of about 4.5 milliseconds is caused at the input of inverter 147 by introducing a time constant equal to this 4.5 millisecond value by means of capacitor 147a and resistor 147b at the input of inverter 147. This holds the input switching level low for approximately one time constant after the output of NAND gate 146 goes high so that the output of the inverter is within nominal blanking pulse width for television transmission. A suitable multi-inverter device for inverter 147 is a 4069PC offered by Fairchild Semiconductor Components Group. The other inverters of this device being used as inverters 207, 210, 217 and 218 which are described hereinafter. Switch 148 is provided as an external operator control for pattern selection. Switch 148 is a four-position switch which is used to connect to and disconnect from selected Q data outputs on integrated circuit 144. The coupling of switch 148 to other portions of the circuitry will be described hereinafter. A suitable device for integrated circuit 144 is a 4040PC offered by Fairchild Semiconductor Components Group.

The positive color burst flag pulses of appropriate width and timing relative to horizontal sync on line 137 are coupled to the base terminal of burst control transistor 149 through capacitor 150 and limiting resistor 151 of circuitry section 20h. The base terminal of transistor 149 is held at emitter potential by means of resistor 152 and this keeps the collector open during the remainder of the horizontal sweep time. The collector terminal of transistor 149 connects to the (B-Y) input of the chroma modulator in circuit section 20r as will be described hereinafter. The emitter terminal of transistor 149 is coupled to a divider network comprising resistors 153 and 154 bypassed by capacitor 155. This divider network provides approximately a 2.0 volt reference on line 156. When the positive burst pulse occurs at the base of transistor 149, the collector switches "ON" pulling line 157 down, thereby developing a negative pulse which is applied to the chroma amplifier to develop correct 3.58 MHz burst amplitude and phase insertion. The voltage polarity and amplitude at the (B-Y) or (R-Y) input determines the phase (hue) and amplitude (saturation), respectively, of the chroma modulation output. Output line 143 carrying the composite sync is coupled through resistor 158 to sync adder transistor 159. The collector of this transistor during sync pulse time is switched to the emitter potential developed through a series of divider resistors 160, 161 and 162 such that the correct voltage level for sync modulation is applied to line 163. Capacitors 164 and 165 decouple the resistor divider network. The composite blanking is developed by NOR gate 168. Horizontal and vertical blanking is developed by NOR gate 168. Horizontal and vertical blanking pulses are applied to the two gate inputs of NOR gate 168. The composite blanking pulse train output from gate 168 is applied across lines 169a and 169b. The pulse train on 169a is inverted and coupled to the blanking adder transistor 170. During blanking pulse time, the collector of transistor 170 is switched to the emitter blanking potential which is slightly higher than the emitter of transistor 159 providing a correct blanking level for television transmission to the modulator section. Line 169b couples the pulse train output from NOR gate 168 across transistor 171 to inverter 172 which also acts as a level converter. The output of inverter 172 is a positive pulse train and is applied to chroma blankers (transistors) as will be described hereinafter. A suitable multi-inverter device for inverter 172 is a 4069PC offered by Fairchild Semiconductor Components group. The other inverters of this device being used as inverters 265, 266, 267, 268 and 269 which are described hereinafter.

In order to be able to develop the unique and dynamic pattern display on a television receiver screen, as will be decribed in greater detail later, two sine wave signals are required. One of these signals is at horizontal sweep frequency and the other is at near vertical sweep rate. The basic oscillator for these signals comprises two high-speed operational amplifiers 175 and 176 which are connected as inverting amplifiers in circuit section 20k (see FIG. 6). A suitable device for amplifiers 175 and 176 is an LM301AN offered by Fairchild Semiconductor Components Group. The frequency determining components include capacitors 177 and 178 and resistors 179, 180 and 181 and variable resistor 182. Without feedback, the output on line 183 would be essentially a square wave near the chosen frequency of approximately 16 KHz. However, amplitude control is accomplished by incorporating in circuit portion 20k a depletion mode FET 184. Transistor bias is established by recitfying the output signal at diode 185 and the proper amount of bias for dynamic control is selected by the wiper adjust of variable resistor 186. Resistor 187 isolates the gate and limits the gate current. Resistor 188 provides amplifier isolation between operational amplifier 175 and operational amplifier 176 and provides for static gain adjustment. Variable resistor 189 and resistor 190 comprise the feedback loop for operational amplifier 176 and provides static gain control. Resistor 191 couples and attenuates the oscillator sine wave output as it is applied to the pulse width modulator portion of circuit section 20m. Resistors 192 and 193 and size control variable resistor 194 comprise a divider-biasing network with capacitor 195 used as a bypass. Variable resistor 194 is provided as an external operator control and may be used to set a desired nominal pattern size prior to switching incoming audio. The output of this sweep oscillator circuit is a sine wave of approximately 10 volts peak to peak centered about the reference of positive 6 volts. With the wiper arm of variable resistor 194 set nearest to the ground potential (size control at "OFF") the signal on line 196 is approximately 4 volts DC below the turn on potential of the pulse width modulators of circuitry section 20m. As the size control is adjusted toward the high end, the sine wave amplitude increases as well as the DC potential on line 196 providing turn on level signals to the pulse width modulator circuit section 20m. Resistors 197, 198 and 199 provide common mode isolation to the operational amplifiers from the positive 6 volts DC reference voltage and the insertion of the synchronizing pulse present on line 200 which is coupled to the portion of circuitry just described by means of capacitor 201. This synchronizing pulse which is derived from the horizontal divider portion of circuit section 20f phase locks the oscillator to the horizontal sync for a stable display. Capacitors 202 and 203 provide HF compensation.

The centering of the display (horizontally) is accomplished by phase adjusting the sweep sync pulse output on line 200 with respect to the horizontal sync pulse on line 206 of the circuit section 20j. (Note that line 206 is tied to the last Q data output of integrated circuit 134 of circuitry section 20f.) The pulse rate reference line 206 is 15,699 Hz. This pulse is inverted by inverter 207 and is then differentiated by capacitor 208 and resistor 209 before being again inverted by inverter 210. The synchronizing pulse output on line 211 which is a narrow positive pulse is applied to an adjustable period one-shot multivibrator comprising capacitors 212 and 213, resistors 214 and 215, variable resistor 216 and inverters 217 and 218. Variable resistor 116 is provided as an external operator control such that the resulting elliptical area patterns can be displayed in the center of the television receiver screen or shifted in either direction (left or right). A full shift will cause the elliptical areas to appear at the edges and converge toward the center as hyperbolic areas. The trailing edge of the pulse on line 211 coupled through capacitor 212 causes inverter 217 to switch the output state from negative to positive. Capacitor 213 and resistors 215 and 216 determine the "OFF" time of inverter 218 and allow for a 5-50 microsecond period adjustment of the output on line 219. Capacitor 220 and resistor 221 differentiate the pulse such that the trailing edge of the pulse which varies in time with respect to line 211 is applied to one input of NOR gate 222. The other input of NOR gate 222 is tied to switch 148 which, for a smooth edged display pattern is in position 1 and tied to ground. The output of NOR gate 222 is a single pulse at the horizontal sync rate. A suitable device for NOR gate may be one part of a 4025PC offered by Fairchild Semiconductor Components Group. With switch 148 in position number 2, an interrupting signal from integrated circuit 144 is delivered to circuit section 20j and the sync pulse output from NOR gate 222 is effectively blanked by approximately 50% at a pulse rate frequency of 1720 Hz. This causes an alternate locked-unlocked oscillator operation of horizontal sweep oscillator circuit section 20k and if the frequency adjustment of variable resistor 182 is slightly low, a jagged edge or tear-like effect will be present at the edges of the various patterns created by this circuit and displayed on the television receiver screen. The position of pattern switch 148 can be varied in order to select a slower pulse rate frequency from integrated circuit 144 for an interrupting frequency rate of either approximately 1720 Hz, 860 Hz or 430 Hz causing varied edge patterns for the resulting display.

Although synchronizing signals have previously been mentioned as necessary for the desired horizontal and vertical sync rates, it is to be understood that the providing of such synchronizing signals may be from a circuit section as described as well as from any of a variety of other sources, such as, for example, the internal circuitry of a television receiver on which the patterns are displayed.

Figure 8:
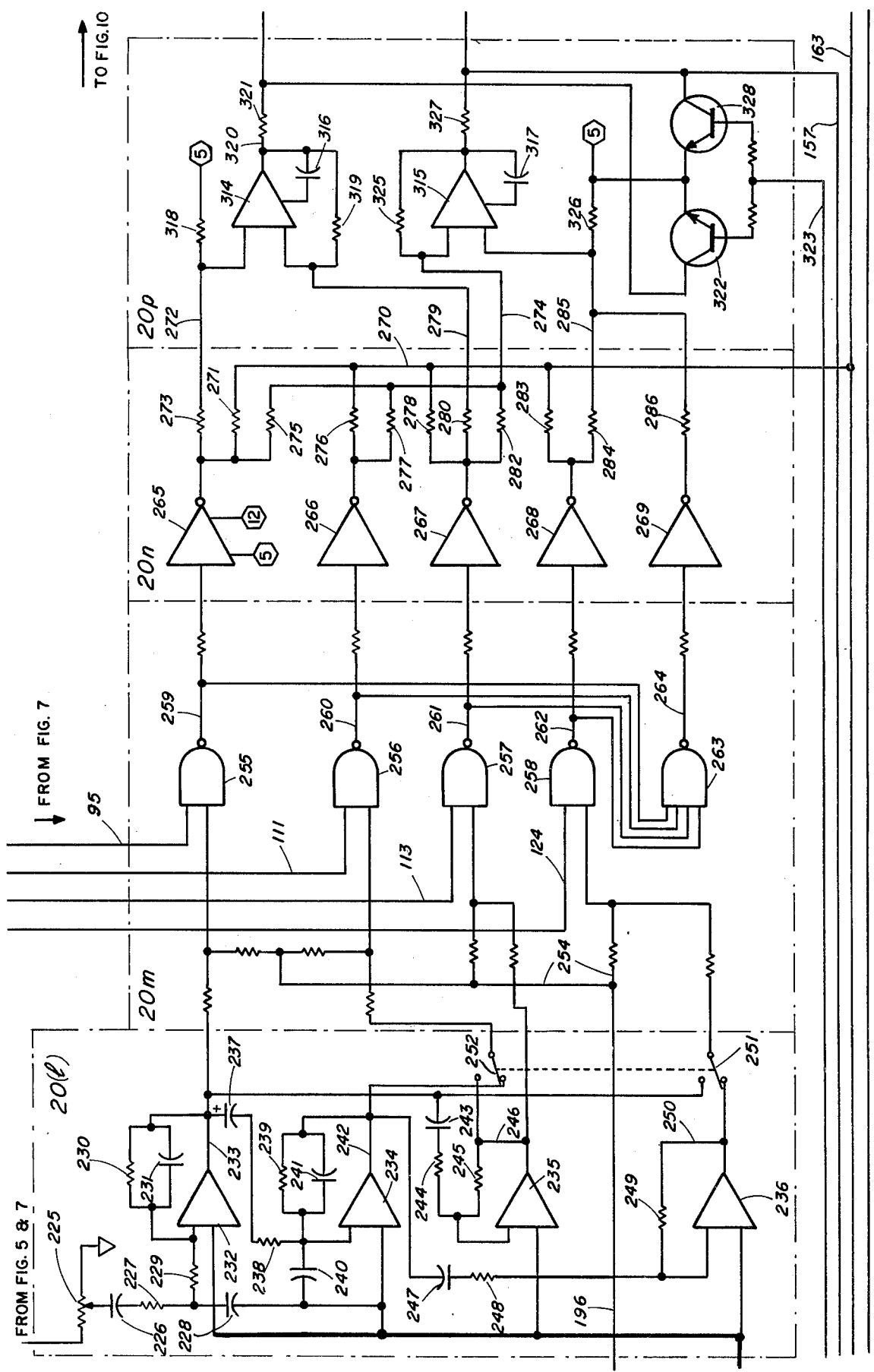
FIG. 8 is a schematic diagram of another portion of the circuitry comprising the overall converter-modulator circuit of FIG. 1.

The vertical sweep component of the pattern display is generated by filtering, amplifying, processing and phase-shifting the 60 Hz line signal into four sine wave signals of equal amplitude with 0°, 90°, 180° and 270° phase shift relationships, respectively. This is performed in the vertical scanning circuit section 20(l) (see FIG. 8). Transformer 24 supplies a 60 Hz sine wave that is slightly clipped due to rectification loading. A nominal 18 volt AC signal is applied across variable resistor 225, the wiper arm of which is used to select the desired amplitude for pattern size display, and this signal is coupled through capacitor 226 to a filter network comprising resistor 227 and capacitor 228 which phase shift the clipped portion of the sine wave by approximately 45°. Variable resistor 275 is provided as an external operator control and affects pattern size similar to variable resistor 194. Thereafter amplification and phase shift occurs within an amplifier portion consisting of resistors 229 and 230 and capacitor 231 with operational amplifier 232 removing the remaining distortion. The signal on line 233 is a relatively clean 60 Hz sine wave centered about a 6 volt DC level which corresponds to the 6 volt reference voltage input connected to the positive (noninverting) input of the four operational amplifiers 232, 234, 235 and 236. A suitable device for each of the operational amplifiers 232, 234, 235 and 236 is an LM1458CP1 offered by Fairchild Semiconductor Components Group. These amplifiers function as phase splitters. The output of amplifier 232 is coupled through capacitor 237 to an amplifying and phase shifting portion including resistors 238 and 239 and capacitors 240 and 241 and amplifier 234. The signal on line 242 is a positive 90° from the phase of the signal on line 233. The two remaining signals are derived from the signals on lines 233 and 242. Capacitor 243 couples the signal on line 233 to a unity gain inverting amplifier portion including resistors 244 and 245 and amplifier 235. The signal on line 246 is thus shifted by a positive or negative 180° from the signal on line 233. Similarly, capacitor 247 couples the positive 90° signal of line 242 to a second unity gain amplifier portion including resistors 248 and 249 and amplifier 236. The signal present on line 250 is then shifted a positive 270° from the signal on line 233 or either a positive or a negative 180° from the signal on line 242.

It is to be understood that any repeating wave signal could be employed such as a triangle wave to create a diamond-shaped display rather than the elliptical area patterns produced by sine waves. It is also possible to use a nonsymmetrical wave signal such that the pattern would not increase and decrease in size equally (symmetrically) about its geometric center. The disclosure of a sine wave and the symmetrical elliptical areas which result is by way of example only and is not intended to be limiting in any respect.

Additional visual effects can be created on the display pattern by means of switches 251 and 252 which are ganged together and operate together in one of two positions for either two converging (paired) patterns or four individual (separate) patterns. The movable contact of each switch 251 and 252 is connected to the pulse width modulator circuit section 20m described hereinbelow.

The pulse width modulator circuit section 20m incorporates CMOS, NAND gate components and for an understanding of the uniqueness afforded by this particular design, an understanding of CMOS characteristics is necessary. Although CMOS transfer characteristics represent a very close approximation of an ideal switch, if multiple devices are stacked in series, the transfer characteristics are shifted slightly. There is a resistor-divider effect that reduces the source-to-drain voltage of the device and shifts the effective threshold slightly. At higher supply voltages, the CMOS devices are operating at a lower impedance level than when switching through threshold, therefore the instantaneous power dissipation is a function of input voltage. This effect contributes to the AC power dissipation of CMOS, but is normally small when compared to the AC power dissipation caused by the charging and discharging of load capacitors.

The CMOS logic family exhibits this unique characteristic which by itself permits the analog control of pulse width output when a steady state DC voltage near the threshold level for turn-on and a recurring waveform at logic levels are compared at the gate inputs of a logic NAND CMOS device. This unique characteristic is utilized for a high-speed pulse width modulator by maintaining a sine wave signal at one gate and varying the DC voltage level near threshold at the other gate input. The speed of the output waveform is improved by a buffer stage following the gate output within the device itself.

The actual circuit design (circuit section 20m) using the above-described CMOS device characteristic is described as follows. The signal input to circuit section 20m consists first of a single phase 15,699 Hz sign wave incoming on line 254 which is adjustable in amplitude and bias from variable resistor 194 by way of line 196. The other inputs are from the signals on lines 233 and 242 and the movable contacts of switches 252 and 251 which are 90° phase related signals of equal amplitude sine waves at 60 Hz (line frequency) and which are adjustable in amplitude by variable resistor 225. Each of the individual 60 Hz signals is resistively added to the single phase signal of 15,699 Hz in equal proportions and then applied to one gate input of a corresponding NAND gate, CMOS device from the group of NAND gates 255, 256, 257 and 258. At the second gate input of NAND gate 255 is a filtered DC level changing in proportion to the volume of audio in the 30-250 Hz frequency range at the three db roll-off points. The resulting output from NAND gate 255 is a pulse changing from a quiescent level of 12 volts to 0 volts with a pulse width varying in proportion to the control voltage from the 30-250 Hz (red) low-pass filter section 20d1 via line 95. A suitable multi-gate device for NAND gates 255-258 is a 4011PC offered by Fairchild Semiconductor Components Group.

With the exception of the previously noted phase differences of the incoming signals all of the NAND gates 255 to 258 perform identically with the appropriate control voltage varying the pulse width or pattern size. It is noted that NAND gate 256 is associated with the low, mid-range filter section 20d2 for yellow, NAND gate 257 with the high, mid-range filter section 20d3 for green and NAND gate 258 with the high-pass filter section 20d4 for blue by way of lines 111, 113 and 124, respectively. As the volume level increases in a given filter section frequency range, the corresponding color pattern symmetrically increases in size up to a maximum level limited by the static settings of variable resistors 225 and 194.

With a suitable low frequency control voltage, the output on line 259 is a pulse width modulated, negative-going waveform synchronized with the horizontal sync and sweeping at a vertical rate approximately equal to line frequency. Similarly, lines 260, 261 and 262 represent the outputs corresponding to low, mid-range, high mid-range and high-pass frequency input voltage levels. Each of these four lines of output signals is coupled through corresponding resistors to the subsequent level converter stages of circuit section 20n. The level converter stage also develops a quiescent or background level which must be blanked during pattern development and display and to achieve this blanking all four outputs from NAND gates 255-258 are NAND-gated by NAND gate 263. Thus any negative output from either NAND gate 255, 256, 257 or 258 will result in a positive output pulse on line 264. This output signal is resistor coupled to an inverter in the level converter portion of circuit section 20n.

Referring to circuit section 20n, the output of NAND gates 255-258 and 263 are coupled to inverters 265-269, respectively. Each such inverter is a CMOS inverter which is operated between positive 12 volts and positive 5 volts. Thus a logical "0" is a 5 volt level which is the reference level for the chroma modulator inputs to the subsequent chroma encoder and chroma modulator circuit sections. A high (logical "1") output from any one of NAND gates 255-258 or 263, which represents no modulation, will result in a 5 volt (logical "0") output from the corresponding inverter of the group of inverters 265-269. Conversely, a low (logical "0") output from NAND gates 255-258 or 263 will result in a 12 volt output from inverters 265-269. Such an inverter device includes internal protective diodes to prevent gate excursions below the $V_{ss}$ level to the device which would destroy such a device.

The output of invertor 265 is coupled to luminance line 270 through resistor 271, to the plus (R-Y) line 272 through resistor 273 and to the minus (B-Y) line 274 through resistor 275 to produce the correct analog level signal for a "red" representation. The output from inverter 266 is similarly coupled through resistor 276 to luminance line 270 and through resistor 277 to minus (B-Y) line 274 to produce a "yellow" representation. The output of inverter 267 is coupled to the luminance line 270 through resistor 278, to the minus (R-Y) line 279 through resistor 280 and to the minus (B-Y) line 274 through resistor 282 to produce a "green" representation. The output of inverter 268 is coupled through resistor 283 to luminance line 270 and through resistor 284 to the plus (B-Y) modulator line 285 for a "blue" representation. The output of inverter 269 is coupled to the plus (B-Y) modulator line 285 through resistor 286 for generating a blue background on the display screen of the television receiver. The above-described grouping of resistors are coupled to the following chroma encoder circuit section 20p, as will be described, and are designed to convert a digital signal to an analog level.

The chroma encoder circuit section 20p translates analog single polarity signals from the level converter-modulator matrix circuit section 20n by lines 272 279, 274 and 285 to dual polarity signals to match the input characteristics of the chroma modulator in circuit section 20r. The input requirements of circuit section 20r are, for hue information; a positive or negative signal with respect to a positive 5 volt reference and for saturation; an amplitude controlled level relative to the color intensity desired. Two high-speed operational amplifiers 314 and 315 are used as voltage followers and capacitors 316 and 317 compensate amplifiers 314 and 315 respectively for one MHz operation. Operational amplifier 314 drives the (R-Y) input to the chroma modulator (pin 2 of integrated circuit 350). Resistors 318 and 319 act as dividers in conjunction with the resistor network of circuit section 20n. Positive going signals at the positive input of operational amplifier 314 are divided and buffered to the low Z output of operational amplifier 314. Positive going signals at the negative input of operational amplifier 314 are divided and inverted and appear on output line 320. Resistor 321 isolates the low Z output of operational amplifier 314 for insertion of blanking. Transistor 322 is turned on during blanking time by the pulse train coming from inverter 172 on line 323. Line 324 is pulled down through the collector of transistor 322 to the positive 5 volt reference level resulting in removal of chroma modulation. A suitable device for operational amplifier 314 is an LM301AN offered by Fairchild Semiconductor Components Group.

The (B-Y) input to the chroma modulator (pin 4 of integrated circuit 350) is divided by operational amplifier 315 and associated resistors 325 and 326. A suitable device for operational amplifier 315 is an LM301AN offered by Fairchild Semiconductor Components Group. Resistor 327 isolates the output of operational amplifier 315 for insertion of blanking and reference burst gate. Blanking is accomplished through the collector of transistor 328 and for correct color reception, the burst gate is inserted in proper timing to the sync by "pulling down" the (B-Y) input to a 2.0 volt reference thereby establishing the necessary burst modulation level and hue. Although the collectors of transistors 149 and 328 are tied together, the nominal breakdown level of collector to base reverse is not exceeded in either transistor.

Figure 10:
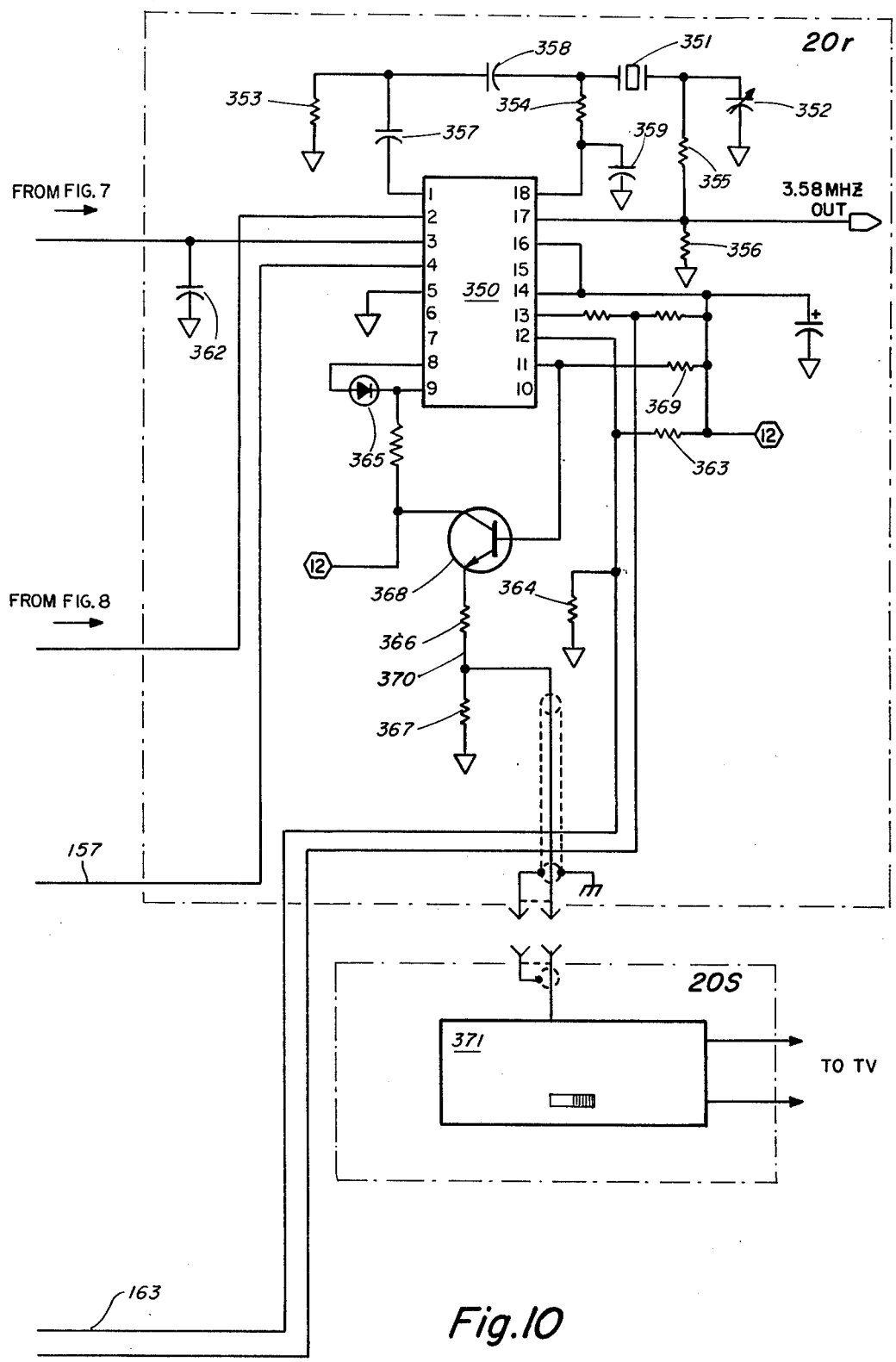
FIG. 10 is a schematic diagram of another portion of the circuitry comprising the overall converter-modulator circuit of FIG. 1.

The chroma and luminance modulator and video output circuit section 20r (see FIG. 10) has as its main component integrated circuit 350 which is a special purpose linear IC which is designed for simple color television modulation and provides chroma, video, and audio modulation and a 3.58 MHz reference oscillator input. This 3.58 MHz is delivered to one input of exclusive OR gate 130 in circuit section 20e as previously described. A suitable device for integrated circuit 350 is an LM1889N offered by National Semiconductor Corp. of Santa Clara, Californina. The associated circuitry for this special purpose linear I.C. 350 are crystal 351, trimmer capacitor 352, resistors 353, 354, 355 and 356, and capacitors 357 and 358. Capacitor 359 is for decoupling.

The chroma reference of integrated circuit 350 is connected to the 5 volt supply and bypassed by capacitor 362 at pin 3. Pin 2 of integrated circuit 350 is the (R-Y) input. Positive signals at pin 2 with respect to 5 volts drive the chroma phase at approximately +90° producing red hues. Negative signals with respect to the 5 volt reference drive the chroma phase at approximately −90° producing green hues. Pin 4 of integrated circuit 350 is the (B-Y) input. Positive signals at pin 4 with respect to the 5 volt reference drive the chroma phase at approximately +180° producing blue hues and negative going signals at pin 4 with respect to the 5 volt reference drive the chroma phase at approximately 0° producing yellow hues. In all cases, saturation levels are controlled by the signal amplitude. Input pins 2 and 4 of integrated circuit 350 receive blanking and a negative going burst (reference pulse) and this produces the correct duration, phase and amplitude burst of 3.58 MHz (sine wave) on the "back porch" of the blanking pulse to activate and synchronize the chroma circuit of the television receiver. All chroma modulation functions are encompassed and added within integrated circuit 350 to the luminance information input at pin 12. Resistors 363 and 364 are dividers for the luminance resistor matrix of circuit section 20n and establish the sync/-blanking to video ratio of 1:3.5 and background luminance. The composite video signal is available at pin 11 and is used to drive an emitter follower as a video output stage. Diode 365 is used to develop the correct polarity video signal which is positive-going sync; negative-going video. Resistors 366 and 367 provide impedance matching for circuit section 20s through a 75-ohm cable and drop the DC level from approximately 11 volts at the emitter of transistor 368 to the 6.5 volt level required for quiescent operation. Resistors 366 and 367 thereby provide a current source for the channel 3, RF modulator 371. Resistor 369 is selected to obtain the correct peak to peak video level on line 370 for the proper modulation. RF modulator 371 (see section 20s) is a conventional modularized wide band unit which is specifically designed for and tuned to channel 3 for FCC, Class I, television devices. A suitable device for RF modulator 371 is model 1082/1092 offered by Astec International, LTD. of Palo Alto, California.

One further feature of audio-to-video converter-modulator 20 is the capability to be switched into a test mode prior to actual audio display. This test feature is shown separately for drawing clarity by FIG. 11. The test circuit utilizes the signal of the Q10 output (pin 14) of integrated circuit 144. This output is coupled through resistors 380 and 381 and capacitor 382 to test terminal 383 of switch 384. Switch 384 which is positioned in line with and between transformer 44 and potentiometer 47, is a two position switch for either a test mode or playing mode. When switched to the test mode, the four primary display color elliptical areas will appear in a vertical stack on the screen.

By adjusting the centering control variable resistor 216, the operator can select the desired position on the screen or can convert the elliptical areas into hyperbolic areas. By means of variable resistors 194 and 225, the operator can determine a nominal pattern size such that as audio volume ranges from low to high levels the pattern will range from small to large.

In addition to these operator controls associated with converter-modulator 20, various television receiver controls may also be used to set the proper color hues and to select the desired brightness and contrast.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An audio signal to color pattern display signal converter-modulator for converting incoming audio signals into corresponding video signals having suitable transmission characteristics for display of a multicolored, symmetrically changing pattern on a television receiver which comprises:
    (a) a power supply section;
    (b) an input audio signal section;
    (c) a plurality of filter sections coupled to said input audio signal section, each of said plurality of filter sections corresponding to a different frequency band and each frequency band corresponding to a different primary display color;
    (d) a frequency doubler circuit section;
    (e) a horizontal sync and burst pulse circuit section coupled to said frequency doubler circuit section;
    (f) a vertical sync circuit section coupled to said horizontal sync and burst pulse circuit section;
    (g) a blanking sync and burst gate adder section coupled to said horizontal sync and burst pulse circuit section and to said vertical sync circuit section;
    (h) a sweep sync circuit section coupled to said horizontal sync and burst pulse circuit section and to said vertical sync circuit section;
    (i) a horizontal sweep oscillator circuit section coupled to said sweep sync circuit section;
    (j) a vertical scanning circuit section coupled to said power supply section;
    (k) a pulse width modulator section including a plurality of logic device means, each of said plurality of logic device means having a first input coupled to a different one of said filter sections and a second input coupled to a different one of a plurality of repeating wave signals for producing a pulse width output signal which is modulated about a center point;
    (l) a level converter-modulator matrix section coupled to said pulse width modulator section;

(m) a chroma encoder circuit section coupled to said level converter-modulator matrix section; and (n) a chroma and luminance modulator and video output circuit section coupled to said chroma encoder circuit section.

2. The converter-modulator of claim 1 wherein, each of said plurality of repeating wave signals are symmetrical and said output signal is modulated symmetrically about said center point.

3. The converter-modulator of claim 2 wherein each of said plurality of repeating wave signals is a sine wave.

4. The converter-modulator of claim 3 wherein said plurality of logic device means are CMOS NAND gates.

5. The converter-modulator of claim 4 wherein said plurality of filter sections includes four sections corresponding to the primary display colors of red, yellow, green and blue.

6. The converter-modulator of claim 5 wherein the output of each filter section is a D.C. voltage level.

7. The converter-modulator of claim 6 wherein there are four of said sine waves, each having a frequency of 60 Hz and being related to each other by phase shifts of 90°, 180° and 270°, respectively.

sync circuit section, said interrupting signal causing the removal of said synchronizing pulse and causing said free-running oscillator to operate alternately in a locked-unlocked sequence and a jagged edge display pattern to appear on said television receiver.

18. The converter-modulator of claim 17 wherein each of said plurality of repeating wave signals is a sine wave.

19. The converter-modulator of claim 18 wherein said plurality of logic device means are CMOS NAND gates.

20. The converter-modulator of claim 19 wherein said plurality of filter sections includes four sections corresponding to the primary display colors of red, yellow, green and blue.

21. The converter-modulator of claim 20 wherein there are four of said sine waves, each having a frequency of 60 Hz and being related to each other phase shifts of 90°, 180° and 270°, respectively.

22. The converter-modulator of claim 1 wherein said audio input signal section includes attenuation means for off setting the effects of bass and treble boost.

23. The converter-modulator of claim 22 wherein said attenuation means includes capacitor means coumeans for receiving a composite audio signal and generating a plurality of voltage signals as a function of frequency and amplitude;

means for generating a plurality of sine waves;

means for converting a plurality of paired combinations of a voltage signal and a sine wave into a corresponding plurality of video signals; and means for applying said video signals on a cathode ray tube in a plurality of discrete elliptical patterns which merge as a function of audio signal amplitude to produce composite colors.

34. An electronic apparatus for converting composite audio signals into video display on a cathode ray tube, said electronic apparatus comprising:

first circuitry means for receiving a composite audio signal;

second circuitry means coupled to said first circuitry means for separating said composite audio signal into a plurality of frequency bands;

third circuitry means for generating a plurality of sine waves phase-shifted from each other;

fourth circuitry means coupled to said second circuitry means and to said third circuitry means for processing said plurality of voltage signals with said plurality of sine waves on a one-to-one basis into a corresponding plurality of video signals; and fifth circuitry means for applying said plurality of video signals on a cathode ray tube in a plurality of discrete elliptical patterns which merge as a function of audio signal amplitude to produce composite colors.

35. The electronic apparatus of claim 34 wherein there are four frequency bands, four corresponding sine waves, phase-shifted by increments of 90 degrees, and four resultant elliptical patterns.

36. The electronic apparatus of claim 34 wherein said fifth circuitry means includes one CMOS NAND gate for each paired combination of a voltage signal and a sine wave.

37. An electronic apparatus for converting composite audio signals into video display on a cathode ray tube, said electronic apparatus comprising:

a plurality of audio filter sections coupled to said composite audio signals, each audio filter circuit section corresponding to a different frequency band for generating a plurality of voltage signals in response to audio present in said frequency bands, there being a separate voltage signal for each of said frequency bands;

a sine wave circuit section providing a plurality of phase-shifted sine waves, there being a different sine wave for each of said separate voltage signals;

a pulse width modulator circuit section having a plurality of CMOS NAND gates coupled to said voltage signals and to said sine waves, each of said gates having one of said voltage signals at one input and one of said sine waves at another input; and a video generation and display circuit section coupled to the output of each of said CMOS NAND gates for generating a corresponding video signal and for applying said video signals on a cathode ray tube in a plurality of discrete elliptical patterns which merge as a function of audio signal amplitude to produce composite colors.

* * * * *